(12) United States Patent
Dai et al.

(10) Patent No.: US 8,660,032 B2
(45) Date of Patent: Feb. 25, 2014

(54) METHOD FOR TRANSMITTING FEEDBACK OF CHANNEL STATE INFORMATION AND USER EQUIPMENT

(75) Inventors: Bo Dai, Shenzhen (CN); Yijian Chen, Shenzhen (CN); Jun Xu, Shenzhen (CN); Guanghui Yu, Shenzhen (CN); Qianzi Xu, Shenzhen (CN); Ruyue Li, Shenzhen (CN); Junfeng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/520,478

(22) PCT Filed: Jun. 29, 2010

(86) PCT No.: PCT/CN2010/074673
§ 371 (c)(1),
(2), (4) Date: Jul. 3, 2012

(87) PCT Pub. No.: WO2010/149089
PCT Pub. Date: Dec. 29, 2010

(65) Prior Publication Data
US 2012/0320774 A1    Dec. 20, 2012

(30) Foreign Application Priority Data
Jan. 8, 2010    (CN) .......................... 2010 1 0003602

(51) Int. Cl.
*H04L 12/26*    (2006.01)
(52) U.S. Cl.
USPC .......................................... 370/252; 375/260
(58) Field of Classification Search
USPC .................... 370/252, 329; 375/260
See application file for complete search history.

(56) References Cited

U.S. PATENT DOCUMENTS

| 2004/0022213 A1* | 2/2004 | Choi et al. ................. 370/332 |
| 2010/0027697 A1* | 2/2010 | Malladi et al. ............... 375/260 |
| 2010/0202306 A1* | 8/2010 | Jersenius et al. ............. 370/252 |

FOREIGN PATENT DOCUMENTS

| CN | 101405959 A | 4/2009 |
| CN | 101411110 A | 4/2009 |
| CN | 101496439 A | 7/2009 |
| WO | 2009002251 A2 | 12/2008 |

OTHER PUBLICATIONS

P.R. China, State Intellectual Property Office, International Search Report for International Application No. PCT/CN2010/074673 mailed Oct. 8, 2010.

(Continued)

*Primary Examiner* — Wei Zhao
(74) *Attorney, Agent, or Firm* — Bright IP Law Offices

(57) ABSTRACT

Disclosed are a method for transmitting feedback of channel state information and user equipment. The method comprises: under a transmission mode, user equipment (UE) determining contents carried by channel state information according to indication information, wherein the indication information comprises at least one of the following: rank indicator (RI), channel quality indication information (CQI) and configuration signaling sent by a base station eNodeB; and the UE sending the channel state information to the eNodeB. The present invention solves the problem that the contents provided by the channel state information are not suitable for those transmission modes under which a multiple user-MIMO and a single user-MIMO can be switched from one to another, improving the applicability of the channel state information.

18 Claims, 3 Drawing Sheets

Under a transmission mode, user equipment (UE) determines contents carried by channel state information according to indication information — S102

UE sends the channel state information to an eNodeB — S104

(56) References Cited

OTHER PUBLICATIONS

Extended European Search Report for EP Application No. 10791595.1 mailed Sep. 20, 2013.
Alcatel-Lucent: "UE PMI feedback signalling for user pairing/coordination", 3GPP Draft; R1-090777, Feb. 3, 2009.
Alcatel-Lucent et al: "Estimation of extended PMI feedback signalling required for user intra-cell and inter-cell coordination", 3GPP Draft; R1-094614, Nov. 9, 2009.
Alcatel-Lucent Shanghai Bell et al: "Dynamic SU-MU MIMO switching based on adaptive implicit feedback", 3GPP Draft; R1-094610, Nov. 9, 2009.

* cited by examiner

METHOD FOR TRANSMITTING FEEDBACK OF CHANNEL STATE INFORMATION AND USER EQUIPMENT

CROSS REFERENCE TO RELATED APPLICATIONS

This application is the U.S. National Stage of International Patent Application No. PCT/CN2010/074673 filed on Jun. 29, 2010, which claims priority to Chinese Patent Application No. 201010003602.4 filed on Jan. 8, 2010. Both the PCT Application and Chinese Application are hereby incorporated by reference in their entirety.

FIELD OF THE INVENTION

The present invention relates to the technical field of communications, and particularly to a method for transmitting feedback of channel state information and user equipment.

BACKGROUND OF THE INVENTION

Coordinated Multiple Input Multiple Output (abbreviated as MIMO) technology, also referred to as Coordinated Multipoint transmission and reception (COMP) technology, is to use coordinated transmission of transmitting antennae within a plurality of cells to improve the capacity of the wireless links at the cell edge and the transmission reliability, which can effectively solve the cell edge interference problem.

In wireless communication, if a plurality of antennae are used at the transmitting end (such as base station eNB), the transmission rate can be improved using the manner of spatial multiplexing, i.e., different data are transmitted at different antenna locations on the same time frequency resource at the transmitting end, and a plurality of antennae are also used at the receiving end (user equipment UE). Generally speaking, MIMO has two transmission forms: one is Single User-MIMO (abbreviated as SU-MIMO), which is to allocate all the antenna resources to the same user in the case of a single user; another is Multiple User-MIMO (abbreviated as MU-MIMO), which is to allocate the resources of different antenna spaces to different users in the case of multiple users and to achieve serving a plurality of users at the same time and on the same carrier by way of spatial distinction, and the average throughput within the cell can be improved by way of the MU-MIMO transmission form.

In particular, SU-MIMO refers to one user equipment alone occupying the physical resources allocated to the user equipment within one transmission interval. MU-MIMO refers to one user equipment and at least one other user equipment sharing the physical resources allocated to the user equipment within one transmission interval. One user equipment and some other user equipments share the same physical resource (including time frequency resource) by way of space division multiple-access or space division multiplexing.

In the long-term evolution (abbreviated as LTE) of the 3rd Generation Partnership Project, the user equipment is deployed to be based on one of the following transmission modes by way of high layer signaling semi-statically, and as to version 8, the following modes are included:

Mode 1: Single-antenna port; port 0
Mode 2: Transmit diversity
Mode 3: Open-loop spatial multiplexing
Mode 4: Closed-loop spatial multiplexing
Mode 5: Multi-user MIMO
Mode 6: Closed-loop Rank=1 pre-coding
Mode 7: Single-antenna port; port 5

The UE determines different transmission formats of the channel state information according to different transmission modes, and then the transmitting end (i.e., eNB) carries out scheduling according to the channel state information fed back by the UE and configures new channel state information for actual transmission based on a certain principle (such as maximum capacity principle). In this case, the channel state information fed back by the UE includes:

Channel Quality Indication information (abbreviated as CQI) is an indicator measuring the quality of a downlink channel. In the 36-213 specification, CQI is represented using integral values of 0-15, which represent the levels of different CQIs respectively, and different CQIs have their own corresponding modulation and coding scheme (MCS).

The pre-coding matrix indicator (abbreviated as PMI) is an index number of a pre-coding codebook fed back by the UE. Under three modes such as Closed loop spatial multiplexing, MU-MIMO, and Closed-loop RI=1, the PMI information needs to be fed back, and the PMI information does not need to be fed back under other transmission modes. The feedback granularity of PMI can be that the whole bandwidth feeds back one PMI or that the PMI is fed back according to a subband.

Rank indicator (abbreviated as RI) is used for describing the number of spatially independent channels and corresponds to the rank of a channel response matrix. Under the Open loop spatial multiplexing and Closed loop spatial multiplexing, the UE needs to feed back RI information, and it does not need to feed back RI information under other modes. The rank of a channel matrix corresponds to the number of layers.

Since the feedback transmission method of the channel state information has a significant impact on the precision of the feedback information, it plays an important role for the transmitting end to perform correct resource scheduling and improve the transmission performance of the wireless system. However, the definition of the contents carried by the channel state information in the prior art are only suitable for the case of single user-MIMO, or only suitable for the case of multiple user-MIMO, but it is not suitable for those transmission modes under which a multiple user-MIMO and a single user-MIMO can be switched from one to another.

SUMMARY OF THE INVENTION

The main object of the present invention is to provide a method for transmitting feedback of channel state information and user equipment so as to solve the problem that the contents provided by the channel state information are not suitable for those transmission modes under which a multiple user-MIMO and a single user-MIMO can be switched from one to another.

A method for transmitting feedback of channel state information is provided according to one aspect of the present invention, comprising: under a transmission mode, user equipment (UE) determining contents carried by channel state information according to indication information, wherein the indication information comprises at least one of the following: rank indicator (RI), channel quality indication information (CQI) and configuration signaling sent by a base station eNodeB; and the UE sending the channel state information to the eNodeB.

User equipment is provided according to another aspect of the present invention, comprising: a determination module for, under a transmission mode, determining contents carried by channel state information according to indication information, wherein the indication information comprises at least one of the following: rank indicator (RI), channel quality indication information (CQI) and configuration signaling sent by a base station eNodeB; and a sending module for sending the channel state information to the eNodeB.

By way of the present invention, the UE determines the contents carried by the channel state information according to the indication information and sends the channel state information to the base station, which solves the problem that the contents provided by the channel state information are not suitable for those transmission modes under which a multiple user-MIMO and a single user-MIMO can be switched from one to another.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention will be described hereinafter in detail with reference to the accompanying drawings and in conjunction with embodiments. It needs to note that the embodiments of the present application and the features in the embodiments can be combined with each other if there is no conflict.

Figure 1:
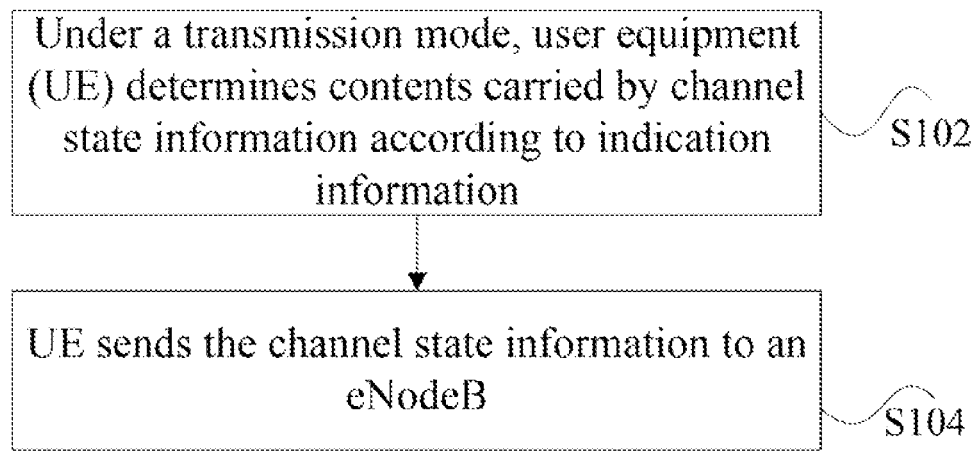
FIG. 1 is a flowchart of a method for transmitting feedback of channel state information according to the embodiments of the present invention.

The embodiments of the present invention provide a method for transmitting feedback of channel state information, and FIG. 1 is a flowchart of the method for transmitting feedback of channel state information according to the embodiments of the present invention, and as shown in FIG. 1, the method comprises:

Step S102: under a transmission mode, user equipment (UE) determines contents carried by channel state information according to indication information, wherein the indication information includes at least one of the following: rank indicator (RI), channel quality indication information (CQI) and configuration signaling sent by a base station eNodeB;

Step S104: the UE sends the channel state information to the eNodeB.

In relevant art, the contents carried by the channel state information are only suitable for one from a single user-MIMO mode and a multiple user-MIMO mode and are not suitable for the flexible handover between the single user-MIMO mode and multiple user-MIMO mode, however, in the above method, the user equipment determines the contents carried by the channel state information according to the indication information, thus it can be suitable for the single user-MIMO mode and multiple user-MIMO mode so as to support the transmission mode handover between the single user-MIMO mode and multiple user-MIMO mode.

The above transmission mode can include a transmission mode handover between multiple user coordinated multiple input multiple output (MIMO) and single user-MIMO mode.

Preferably, the contents carried by the channel state information can include one of the following: M pre-coding matrix indicators (PMI) and N CQIs, K CSIs, 1 RI, wherein M, N and K are positive integral numbers. The user equipment can determine the values of the above M, N and K according to the indication information and can also determine the types of PMI and CQI according to the indication information.

Preferably, the contents carried by the channel state information can further include channel state indication information. The channel state indication information is used for representing that the type of the first PMI is Best Companion Index (BCI) for pre-coding matrix or Worst Companion Index (WCI) for pre-coding matrix.

Hereinafter, the process of the UE determining the contents carried by the channel state information according to the indication information if the indication information includes rank indicator (RI), channel quality indication information (CQI) and configuration signaling sent by a base station eNodeB will be described in detail.

I. The indication information includes RI:

Determine M PMIs if the rank indicated by the RI=X, the M PMIs include one of the following: two first PMIs, two second PMIs, one of the first PMIs and one of the second PMIs, one of the first PMIS, and one of the second PMIs, wherein X=1, 2, ..., 8. Hereinafter, several specific situations will be described in detail:

1) Divide according to the feedback type and the number of PMIs 1. if X=1, the M PMIs include one of the following: one of the first PMIs, one of the second PMIs, two of the first PMIs, one of the first PMIs and one of the second PMIs;

2. if 1<X<a predetermined value, the M PMIs include one of the following: one of the second PMIs, two of the first PMIs, one of the first PMIs and one of the second PMIs; and 3. if X>=the predetermined value, the M PMIs include one of the following: one of the second PMIs, one of the first PMIs and one of the second PMIs.

In this case, the first PMI is a multiple user-MIMO feedback mode PMI and the second PMI is a single user-MIMO feedback mode PMI; or the first PMI is an index of a quantization vector or a supplement or enhancement of the second PMI and the second PMI is an index of a quantization matrix, or the first PMI is an index of a quantization vector and the second PMI is an index of a quantization matrix.

The meanings of the above-mentioned supplement and enhancement are to be based on the second PMI feedback, and the remaining represents the PMI index of the current channel information: For example, an enhanced PMI index can represent a worse PMI index (Worst Companion Index, abbreviated as WCI), i.e., worst companion PMI or worst matched PMI, which indicates information about how to generate intra-cell or inter-cell interference to the maximum, that is to say, WCI indicates the worst situation which should be avoided. The enhanced PMI index can also represent better PMI index (Best Companion Index, abbreviated as BCD, i.e., best companion PMI or best matched PMI, which indicates information about how to reduce intra-cell or inter-cell interference to the minimum.

One PMI from the above two PMIs of the same type is a quantization offset value index of another PMI, i.e. a first PMI from two first PMIs can be a quantization offset value index of another first PMI, and one second PMI from two second PMIs can be a quantization offset value index of another second PMI.

2) Divide according the feedback mode of PMI 1. if 1=<the rank X indicated by the RI<=Y, the M PMIs perform feedback according to a first feedback mode;

2. if $Y=<X<=8$, the M PMIs perform feedback according to a second feedback mode;

the above $Y=1, 2, \ldots, 8$, the first feedback mode is to perform feedback according to the multiple user-MIMO mode and the second feedback mode is to perform feedback according to the single user-MIMO mode, or, the first feedback mode is perform hybrid feedback according to the multiple user-MIMO mode and single user-MIMO mode and the second feedback mode is to perform feedback according to the single user-MIMO mode; or the first feedback mode is to perform hybrid feedback according to the multiple user-MIMO mode and single user-MIMO mode and the second feedback mode is to perform hybrid feedback according to the multiple user-MIMO mode and single user-MIMO mode.

In this case, the single user feedback (i.e., single user-MIMO mode feedback) refers to the user equipment performing feedback according to the manner when there is only one user performing transmission, for example, only to feed back the second PMI. Multiple user feedback (i.e. multiple user-MIMO mode feedback) refers to the user equipment performing feedback according to the manner when there are a plurality of users performing transmission, for example, to feed back a plurality of second PMIs, or the second PMI and first PMI. The hybrid feedback of multiple user-MIMO mode and single user-MIMO mode refers to a mode that a pre-coding feedback is added on the basis of the single user-MIMO mode, and the added pre-coding can be the first PMI or can be the second PMI.

Determine N CQIs or K CQIs:

1. if the rank X indicated by the RI=1, the N CQIs or the K CQIs include one of the following: one first CQI, one first CQI and one second CQI.

2. if X=2, 3 or 4, the N CQIs or the K CQIs include one of the following: 2 first CQIs, 2 first CQIs and 1 second CQI.

3. if X=5, 6, 7 or 8, the N CQIs or the K CQIs include one of the following: 2 first CQIs, 2 first CQIs and 1 second CQI, 2 first CQIs and 2 second CQIs.

In the above 1, 2, and 3, the first CQI is a CQI generated according to the single user-MIMO mode, and the second CQI is one of a CQI generated according to the multiple user-MIMO mode, an interference information indication, an interlayer interference information indication, or a single layer channel quality indication. Among a plurality of CQIs of the same type, except a predetermined CQI, the other CQIs are quantization offset value indexes of the predetermined CQI, or the plurality of CQIs of the same type are indexes of quantization values, wherein the predetermined CQI is one CQI among the plurality of CQIs of the same type.

II. The indication information includes the configuration signaling sent by the base station eNodeB:

During its practical application, the process of determining the contents carried by the channel state information according to the configuration signaling includes but not limited to:

1. the UE determining the format (i.e., the type and number of the above PMI and CQI) and the overhead (the size of specific content) of the channel state information according to the configuration signaling; or 2. the UE determining a feedback mode according to the configuration signaling, wherein the feedback mode includes: the UE performing feedback according to the single user-MIMO mode or performing feedback according to the multiple user-MIMO mode or the UE performing hybrid feedback according to the single user-MEMO mode and multiple user-MIMO mode.

III. The indication information includes CQI:

During its practical application, the process of determining the contents carried by the channel state information according to the CQI includes but not limited to:

1. if the value of the $CQI<=h$, the M PMIs include: one second PMI and one WCI; and if the values of the CQIs>h, the M PMIs include: one second PMI and one BCI; or, 2. if the value of the $CQI<=h$, the M PMIs include: one second PMI and one BCI; and if the values of the CQIs>h, the M PMIs include: one second PMI and one WCI; or, 3. if the value of the $CQI<=h$, the M PMIs include: one second PMI; and if the values of the CQIs>h, the M PMIs include: one second PMI; or, 4. if the value of the $CQI<=h$, the M PMIs include: one PMI; and if the values of the CQI>h, the M PMIs include: two PMIs.

The above first PMI is an index of a quantization vector, and the second PMI is an index of a quantization matrix.

It needs to note that the above I to III describe the implementation process of the UE separately determining the contents carried by the channel state information using RI, CQI, or the configuration signaling sent by the eNodeB, and during its practical application, the implementation process described in I to III can be combined with each other, for example, the UE can determine the contents of the channel state information according to a combination of RI and CQI, a combination of RI and configuration signaling, a combination of RI, CQI, and configuration signaling.

In the prior art, when the contents included in the channel state information are more than the quantization of the multiple user-MIMO, there exists a problem of the precision being relatively low, however, in the method provided by the embodiments of the present invention, the first PMI and second CQI which are fed back can improve the quantization precision under the multiple user-MIMO.

Preferably, after step S104, the eNodeB carries out scheduling according to the channel state information. In particular, the eNodeB can select the single user-MIMO mode or multiple user-MIMO mode according to the channel state information for transmission.

By way of the above method, the user equipment can flexibly select the contents carried by the channel state information according to the indication information, thus it can be suitable for single user-MIMO mode and multiple user-MIMO mode so as to support the transmission mode handover between the single user-MIMO mode and multiple user-MIMO mode, and at the same time, the first PMI and/or second CQI being carried by the channel state information which is fed back can improve the quantization precision of the multiple user-MIMO mode so as to simultaneously support single user-MIMO mode and multiple user-MIMO mode.

Hereinafter, the implementation process of the above method for transmitting feedback of channel state information will be described in detail in conjunction with embodiments.

Embodiments

Figure 2:
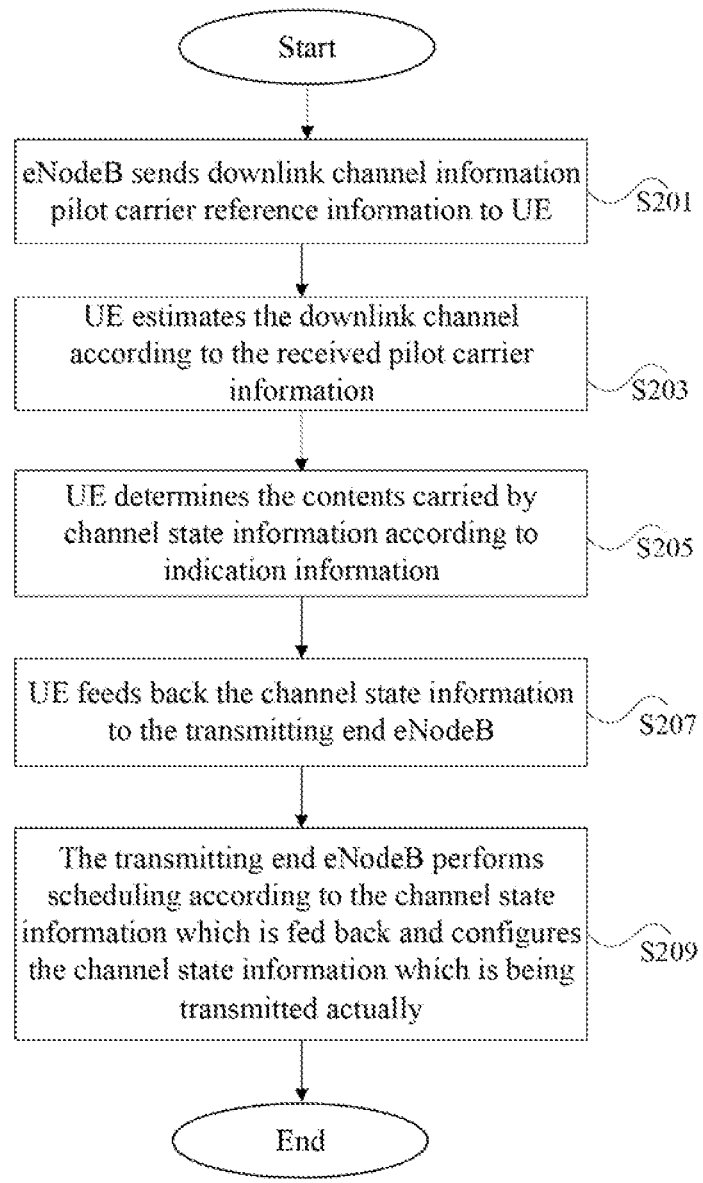
FIG. 2 is a detailed flowchart of the method for transmitting feedback of channel state information according to the embodiments of the present invention.

FIG. 2 is a detailed flowchart of the method for transmitting feedback of channel state information according to the embodiments of the present invention, and the method for transmitting feedback of channel state information according to the embodiments of the present invention mainly comprises the following steps (step S201 to step S209):

Step S201: a transmitting end eNodeB sends a pilot carrier (such as downlink channel information pilot carrier reference information) to user equipment (UE) for the user equipment (UE) to test the state of the downlink channel;

Step S203: the user equipment (UE) estimates the downlink channel according to the received pilot carrier information;

Step S205: the user equipment (UE) determines the contents carried by channel state information according to indication information, wherein the indication information includes at least one of the following: rank indicator (RI), channel quality indication information (CQI) and configuration signaling sent by a base station eNodeB, and the contents carried by channel state information can include one of the following: M pre-coding matrix indicators (PMIs) and N CQIs, K CSIs, 1 RI, wherein M, N, and K are positive integral numbers.

Step S207: the user equipment (UE) provides feedback of the channel state information to the transmitting end eNodeB;

Step S209: the transmitting end eNodeB carries out scheduling according to the channel state information fed back by the user equipment and configures the channel state information which is being transmitted actually, achieving the transmission of single user-MIMO or multiple user-MIMO.

In step S209, the base station transmitting end carries out scheduling according to the channel state information obtained through feedback and generates new channel state information which is needed during actual transmission by a certain algorithm. It should be noted that when the feedback information does not include MU channel state information, it does not mean that the MU-MIMO transmission cannot be performed. Since the base station transmitting end can estimate to obtain the channel quality information of the MU-MIMO system by way of a certain algorithm according to the SU-MIMO channel quality information obtained through feedback. For example, when the rank is 2 in the following Table 2, the CQI information of the MU-MIMO will not be fed back, however, the CQI information of the MU-MIMO can be estimated by way of a certain algorithm according to the SU-CQI 1 and SU-CQI 2 information obtained through feedback.

For the sake of description, a naming convention is given for the following specific expressions: a first type of pre-coding matrix indicator (i.e. the above first PMI, which is represented using PMI 1 hereinafter) refers to an index of a quantization vector, a second type of pre-coding matrix indicator (i.e. the above second PMI, which is represented using PMI 2 hereinafter) refers to an index of a quantization matrix; or the first type of pre-coding matrix indicator (i.e. the above first PMI, which is represented using PMI 1 hereinafter) is a multiple user-MIMO feedback mode PMI and the second type of pre-coding matrix indicator (i.e. the above second PMI, which is represented using PMI 2 hereinafter) is a single user-MIMO feedback mode PMI. A first type of channel quality indication CQI value (i.e. the above first CQI, which is represented using SU-CQI hereinafter) is a CQI generated according to the single user-MIMO mode, and a second type of channel quality indication CQI value (i.e. the above second CQI, which is represented using MU-CQI hereinafter) is one of a CQI generated according to the multiple user-MIMO mode, interference information indication, interlayer interference information indication, or single layer channel quality indication.

Hereinafter, the composition of the above channel state information will be described in detail by way of examples 1 to 4 in conjunction with Tables 1 to 3.

EXAMPLE 1

Please refer to the following Table 1, the values in the following table represent bit numbers, in which the value of the bit number being 0 represents not to feed back, and the bit number the value of which is not 0 is only a reference value, and during practical application, it can also be other values.

TABLE 1

|  | RI = 1 | RI = 2 | RI > 2 |
|---|---|---|---|
| PMI | 6 (vector index) | 6 (matrix index) | 6 (matrix index) |
| SU-CQI 1 | 4 | 4 | 4 |
| SU-CQI 2 | 0 | 4 | 4 |
| MU-CQI | 4 | 4 | 0 |

When the rank is 1, the UE feeds-back a first type of PMI value, which is a 6-bit vector index. This index can be simultaneously applied in an SU-MIMO system and MU-MIMO system; and at the same time, the UE feeds back two 4-bit CQI values, wherein SU-CQI 1 is used for the SU-MIMO system and the MU-CQI is used for the MU-MIMO system.

When the rank is 2, the UE feeds back a PMI value, which is a 6-bit matrix index. This index can be simultaneously applied in the SU-MIMO system and MU-MIMO system; and at the same time, the UE feeds back three 4-bit CQI values, wherein SU-CQI 1 and SU-CQI 2 are used for the SU-MIMO system and the MU-CQI is used for the MU-MIMO system.

When the rank is 3, the UE feeds back a PMI value, which is a 6-bit matrix index. This index can be simultaneously applied in the SU-MIMO system and MU-MIMO system; and at the same time, the UE feeds back two 4-bit CQI values, wherein SU-CQI 1 and SU-CQI 2 are used for the SU-MIMO system.

EXAMPLE 2

Please refer to the following Table 2, the values in the following table represent bit number, in which the value of the bit number being 0 represents not to feed back, and the bit number the value of which is not 0 is only a reference value, and during practical application, it can also be other values.

TABLE 2

|  | RI = 1 | RI = 2 | RI > 2 |
|---|---|---|---|
| PMI 1 | 6 (vector index) | 6 (matrix index) | 6 (matrix index) |
| PMI 2 | 0 | 6 (vector index) | 0 |
| SU-CQI 1 | 4 | 4 | 4 |
| SU-CQI 2 | 0 | 4 | 4 |
| MU-CQI | 4 | 0 | 0 |

When the rank is 1, the UE feeds back a PMI value, which is a 6-bit vector index. This index, i.e. PMI 1, can be simultaneously applied in the SU-MIMO system and MU-MIMO system; and at the same time, the UE feeds back two 4-bit CQI values, wherein SU-CQI 1 is used for the SU-MIMO system and the MU-CQI is used for the MU-MIMO system.

When the rank is 2, the UE feeds back two PMI values, i.e. PMI 1 and PMI 2. In this case, PMI 1 is a 6-bit matrix index and used in the SU-MIMO system; PMI 2 is a 6-bit vector index and used in the MU-MIMO system; and at the same time, the UE feeds back two 4-bit CQI values, wherein SU-CQI 1 and SU-CQI 2 are used in the SU-MIMO system.

When the rank is 3, the UE feeds back a PMI value, which is a 6-bit matrix index. This index, i.e. PMI 1, can be applied in the SU-MIMO system; and at the same time, the UE feeds back two 4-bit CQI values, wherein SU-CQI 1 and SU-CQI 2 are used for the SU-MIMO system.

EXAMPLE 3

Please refer to the following Table 3, the values in the following table represent bit number, in which the value of the bit number being 0 represents not to feed back, and the bit number the value of which is not 0 is only a reference value, and during practical application, it can also be other values.

TABLE 3

|  | RI = 1 | RI = 2 | RI > 2 |
| --- | --- | --- | --- |
| PMI 1 | 6 (vector index) | 6 (vector index) | 6 (matrix index) |
| PMI 2 |  | 6 (vector index) | 6 (vector index) |
| SU-CQI 1 | 4 | 4 | 4 |
| Differential SU-CQI 2 | 0 | 3 | 3 |
| Differential MU-CQI | 3 | 3 | 3 |

When the rank is 1, the UE feeds back a PMI value, which is a 6-bit vector index. This index, i.e. PMI 1, can be simultaneously applied in the SU-MIMO system and MU-MIMO system; and at the same time, the UE feeds back two CQI values, wherein SU-CQI 1 is 4-bit and used for the SU-MIMO system and the MU-CQI is 3-bit, which is an adjustment value based on SU-CQI 1, and these two CQI values are used in the MU-MIMO system together.

When the rank is 2, the UE feeds back two 6-bit PMI values, i.e. PMI 1 and PMI 2, both of which are vector indexes. Both of them can be simultaneously used in the SU-MIMO system and MU-MIMO system; at the same time, the UE feeds back three CQI values, wherein SU-CQI 1 is 4-bit, SU-CQI 2 is 3-bit, and both of them are simultaneously used in the SU-MIMO system, and SU-CQI 2 is an adjustment value based on SU-CQI 1; MU-CQI is 3-bit and is an adjustment valued based on SU-CQI 1, that is to say, SU-CQI 1 and MU-CQI are used in the MU-MIMO system together.

When the rank is 3, the UE feeds back two PMI values, wherein PMI 1 is a 6-bit matrix index and used in the SU-MIMO system; and PMI 2 is a 6-bit vector index and used in the MU-MIMO system. At the same time, the UE feeds back three CQI values, wherein SU-CQI 1 is 4-bit, SU-CQI 2 is 3-bit, and both of them are simultaneously used in the SU-MIMO system, and SU-CQI 2 is an adjustment value based on SU-CQI 1; MU-CQI is 3-bit and is an adjustment valued based on SU-CQI 1, that is to say, SU-CQI 1 and MU-CQI are used in the MU-MIMO system together.

In examples 1 to 3, the process of determining the contents carried by the channel state information according to the rank indicator RI is described, and hereinafter, the process of determining the contents carried by the channel state information according to a configuration signaling or CQI will be described by way of examples 4 and 5.

EXAMPLE 4

The configuration signaling refers to a signaling sent by the base station to the user equipment, and the user equipment determining the contents carried by the channel state information according to the configuration signaling includes but not limited to the following two modes:

1. the user equipment can determine the format and overhead of the feedback according to the configuration signaling.

For example, the user equipment can determine the format and overhead of the feedback according to the feedback mode configured by the base station; or, the configuration signaling indicates the PMI type (first or second) fed back by the user equipment, the number of PMIs which are fed back, the type of CQI (first or second), the number of CQIs which are fed back, etc.

2. the user equipment can determine the feedback mode according to the configuration signaling.

For example, the configuration signaling indicates the user equipment to perform feedback according to the single user transmission mode or perform feedback according to the multiple user transmission mode, or perform hybrid feedback according to the multiple user-MIMO mode and single user-MIMO mode.

EXAMPLE 5

The user equipment determining the contents carried by the channel state information according to the configuration signaling includes but not limited to the following four modes:

1. When the CQI value is smaller than or equal to h, feed back the second PMI and WCI index, and when the CQI value is greater than h, feed back the second PMI and BCI index.

2. When the CQI value is smaller than or equal to h, feed back the second PMI and BCI index, and when the CQI value is greater than h, feed back the second PMI and WCI index.

3. When the CQI value is smaller than or equal to h, feed back the second PMI, and when the CQI value is greater than h, feed back the first PMI.

4. When the CQI value is smaller than or equal to h, feed back one PMI, and when the CQI value is greater than h, feed back two PMIs.

It needs to note that the user equipment can determine the contents carried by the channel state information according to at least one of the rank indicator, configuration signaling, and CQI simultaneously, for example, if the UE determines the contents carried by the channel state information according to the RI and configuration signaling, if the configuration signaling already notifies the overhead of the channel state information, such as 6 bits, then the UE can determine that the channel state information which is fed back includes 1 first PMI the size of which is 6 bits according to the value of RI (such as 1).

Figure 3:
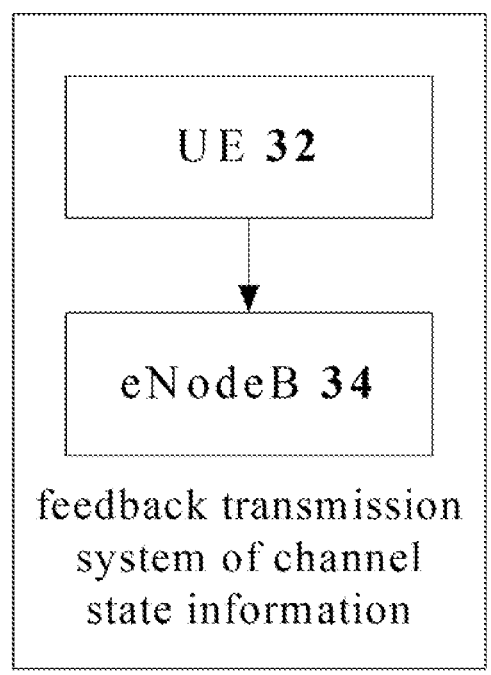
FIG. 3 is a structural block diagram of user equipment according to the embodiments of the present invention.

The embodiments of the present invention also provides user equipment, and FIG. 3 is a structural block diagram of the user equipment according to the embodiments of the present invention, and as shown in FIG. 3, this user equipment comprises: UE 32 for sending channel state information to eNodeB 34, wherein the indication information includes at least one of the following: first pre-coding matrix index (PMI), second channel quality indication (CQI), in which the first PMI is an index of a quantization vector, and the second CQI is a CQI generated according to the multiple user multiple input multiple output (MIMO) mode; and the eNodeB 34 connected to UE 32 for receiving the channel state information.

In summary, by way of the technical solution provided by the embodiments of the present invention, the channel state information can be fed back flexibly and accurately by feeding back different channel state information to the base station, and the receiving end improves the quantization precision of multiple user-MIMO by sending a first PMI and/or a second CQI. This method is also suitable for the transmission mode which is dynamically switched between the single user-MIMO and multiple user-MIMO, which enables the base station to dynamically select, single user-MIMO transmission or multiple user-MIMO transmission according to the actual channel condition, thus achieving the purpose of significantly improving system performance, and at the same time, it can be ensured that the error of the channel state information which is fed back is minimum so as to achieve best feedback effect and reduce the overhead occupied by characteristic feedback.

Obviously, those skilled in the art should understand that the above module or steps of the present invention can be implemented using a general-purpose computing apparatus, and they can be integrated on a single computing apparatus or distributed over a network consisted of multiple computing apparatus; optionally, they can be implemented using computing apparatus executable program code, thus, they can be stored in a storage for being executed by the computing apparatus, and in some cases, the shown or described steps can be performed in an order different from the order here, or they can be made into various integrated circuit modules respectively, or some modules or steps therein are made into a single integrated circuit module for implementation. In this way, the present invention is not limited to any particular combination of hardware and software.

Above description is only to illustrate the preferred embodiments but not to limit the present invention. Various alternations and changes to the present invention are apparent to those skilled in the art. The scope defined in claims shall comprise any medication, equivalent substitution and improvement within the spirit and principle of the present invention.

What is claimed is:

1. A method for transmitting feedback of channel state information, comprising:
   under a transmission mode, user equipment (UE) determining contents carried by the channel state information according to indication information, wherein the indication information comprises at least one of the following: rank indicator (RI), channel quality indication information (CQI); or wherein the indication information comprises configuration signaling sent by a base station eNodeB, and further comprises RI and/or CQI; and
   the UE sending the channel state information to the base station eNodeB; wherein the contents carried by the channel state information include one of the following: M pre-coding matrix indicators (PMIs) and N CQIs, K CQIs, one RI, wherein M, N and K are positive integral numbers;
   wherein if a rank indicated by the RI equals to X, the M PMIs include one of the following: two first PMIs, two second PMIs, one of the first PMIs and one of the second PMIs, one of the first PMIs, and one of the second PMIs, wherein X=1, 2, . . . , 8.

2. The method according to claim 1, wherein if X=1, the M PMIs include one of the following: one of the first PMIs, one of the second PMIs, two of the first PMIs, one of the first PMIs and one of the second PMIs.

3. The method according to claim 1, wherein
   if 1<X<a predetermined value, the M PMIs include one of the following: one of the second PMIs, two of the first PMIs, one of the first PMIs and one of the second PMIs; and
   if X>=the predetermined value, the M PMIs include one of the following: one of the second PMIs, one of the first PMIs and one of the second PMIs.

4. The method according to claim 1, wherein each of the first PMIs is an index of a quantization vector and each of the second PMIs is an index of a quantization matrix; or each of the first PMIs is a multiple user-MIMO feedback mode PMI and each of the second PMIs is a single user-MIMO feedback mode PMI; or each of the second PMIs is an index of a quantization matrix and each of the first PMIs is an index of a quantization vector or a supplement or enhancement of the second PMI.

5. The method according to claim 1, wherein the contents carried by the channel state information further comprise: channel state indication information.

6. The method according to claim 1, wherein
   if 1=<a rank X indicated by the RI<=Y, the M PMIS perform the feedback according to a first feedback mode; or
   if Y=<X<=8, the M PMIs perform the feedback according to a second feedback mode;
   wherein Y=1, 2, . . . , 8, the first feedback mode is to perform the feedback according to a multiple user-MIMO mode and the second feedback mode is to perform the feedback according to a single user-MIMO mode, or, the first feedback mode is perform hybrid feedback according to the multiple user-MIMO mode and the single user-MIMO mode and the second feedback mode is to perform the feedback according to the single user-MIMO mode; or the first feedback mode is to perform hybrid feedback according to the multiple user-MIMO mode and the single user-MIMO mode and the second feedback mode is to perform hybrid feedback according to the multiple user-MIMO mode and single user-MIMO mode.

7. The method according to claim 1, wherein
   if a rank X indicated by the RI equals to one, the N CQIs or the K CQIs include one of the following: one first CQI, one of the first CQIs and one second CQI.

8. The method according to claim 1, wherein
   if a rank X indicated by the RI=2, 3, or 4, the N CQIs or the K CQIs include one of the following: two first CQIs, two of the first CQIs and one second CQI.

9. The method according to claim 1, wherein
   if a rank X indicated by the RI=5, 6, 7, or 8, the N CQIs or the K CQIs include one of the following: two first CQIs, two of the first CQIs and one second CQI, two of the first CQIs and two of the second CQIs.

10. The method according to claim 7, wherein the first CQI is a CQI generated according to a single user-MIMO mode, and the second CQI is one of a CQI generated according to a multiple user-MIMO mode, an interference information indication, an interlayer interference information indication, or a single layer channel quality indication.

11. The method according to claim 1, wherein if the indication information comprises the configuration signaling sent by the base station eNodeB, the UE determining the contents carried by the channel state information according to the indication information further comprises:
   the UE determining a format and an overhead of the channel state information according to the configuration signaling; or,
   the UE determining a feedback mode according to the configuration signaling, wherein the feedback mode includes: the UE performing the feedback according to a single user-MIMO mode or the UE performing the feedback according to a multiple user-MIMO mode or the UE performing hybrid feedback according to the single user-MIMO mode and the multiple user-MIMO mode.

12. The method according to claim 1, wherein
   if the values of the CQIs<=h, the M PmIs include: one second PMI and one Worst Companion Index (WCI); and if the values of the CQIs>h, the M PMIs include: one second PMI and one Best Companion Index (BCI); or, if the values of the CQIs<=h, the M PMIs include: one second PMI and one BCI; and if the values of the CQIs>h, the M PMIs include: one second PMI and one WCI; or, if the values of the CQIs<=h, the M PMIs include: one second PMI; and if the values of the CQIs>h, the M PMIs include: one second PMI; or, if the values of the CQIs<=h, the M PMIs include: one PMI; and if the values of the CQI>h, the M PMIs include: two PMIs;

wherein h is a positive integral number.

13. The method according to claim 12, wherein first PMI is an index of a quantization vector, and the second PMI is an index of a quantization matrix.

14. User equipment, comprising:
a processor configured to execute program units stored on a memory, the program units comprising:
a determination module connected to a sending module for, under a transmission mode, determining contents :carried by channel state information according to indication information, wherein the indication information includes at least one of the following: rank indicator (RI), channel quality indication information (CQI); or wherein the indication information comprises configuration signaling sent by a base station eNodeB, and further comprises RI and/or CQI; and wherein the contents carried by the channel state information include one of the following: M pre-coding matrix indicators (PMIs) and N CQIs, K CQIs, one RI, wherein M, N and K are positive integral numbers; and the sending module connected to the determination module for sending the channel state information to the base station eNodeB;

wherein if a rank indicated by the RI equals to X, the M PMIs include one of the following: two first PMIs, two second PMIs, one of the first PMIs and one of the second PMIs, one of the first PMIs, and one of the second PMIs, wherein X=1, 2, . . . , 8.

15. The method according to claim 2, wherein each of the first PMIs is an index of a quantization vector and each of the second PMIs is an index of a quantization matrix; or each of the first PMIs is a multiple user-MIMO feedback mode PMI and each of the second PMIs is a single user-MIMO feedback mode PMI; or each of the second PMIs is an index of a quantization matrix and each of the first PMIs is an index of a quantization vector or a supplement or enhancement of the second PMI.

16. The method according to claim 3, wherein each of the first PMIs is an index of a quantization vector and each of the second PMIS is an index of a quantization matrix; or each of the first PMIs is a multiple user-MIMO feedback mode PMI and each of the second PMIs is a single user-MIMO feedback mode PMI; or each of the second PMIs is an index of a quantization matrix and each of the first PMIs is an index of a quantization vector or a supplement or enhancement of the second PMI.

17. The method according to claim 8, wherein each of the first CQIs is a CQI generated according to a single user-MIMO mode, and each of the second CQIs is one of a CQI generated according to a multiple user-MIMO mode, an interference information indication, an interlayer interference information indication, or a single layer channel quality indication.

18. The method according to claim 9, wherein each of the first CQIs is a CQI generated according to a single user-MIMO mode, and each of the second CQIs is one of a CQI generated according to a multiple user-MIMO mode, an interference information indication, an interlayer interference information indication, or a single layer channel quality indication.

* * * * *